United States Patent [19]
Bruekers

[11] Patent Number: 6,005,837
[45] Date of Patent: Dec. 21, 1999

[54] DISC-SHAPED INFORMATION CARRIER PROVIDED WITH TWO PORTIONS HAVING DIFFERENT READ-OUT SPEEDS

[75] Inventor: Alphons A. M. L. Bruekers, Eindhoven, Netherlands

[73] Assignee: U.S. Philips Corporation, New York, N.Y.

[21] Appl. No.: 09/080,839

[22] Filed: May 18, 1998

[30] Foreign Application Priority Data

Jun. 23, 1997 [EP] European Pat. Off. ............. 97201921

[51] Int. Cl.$^6$ ....................................................... G11B 7/24
[52] U.S. Cl. ........................................ 369/275.1; 369/275.3
[58] Field of Search ............................. 369/275.1, 275.3, 369/13, 32, 99, 54, 47, 48, 50, 49, 275.2, 288, 52, 111, 178, 116, 33

[56] References Cited

U.S. PATENT DOCUMENTS

| | | | |
|---|---|---|---|
| 5,142,521 | 8/1992 | Terashima et al. | 369/50 |
| 5,343,452 | 8/1994 | Maeda et al. | 369/32 |
| 5,345,435 | 9/1994 | Yamasaki | 369/275.3 |
| 5,373,498 | 12/1994 | Tagiri | 369/275.3 |
| 5,446,724 | 8/1995 | Tabe et al. | 369/275.1 |
| 5,485,448 | 1/1996 | Kishi et al. | 369/99 |

FOREIGN PATENT DOCUMENTS

| | | |
|---|---|---|
| 0780758A2 | 6/1997 | European Pat. Off. . |
| 5128732A | 5/1993 | Japan . |

*Primary Examiner*—Ali Neyzari
*Attorney, Agent, or Firm*—Michael E. Belk

[57] ABSTRACT

A disc-shaped information carrier with a substrate and an information layer which includes optically readable elementary marks having a substantially uniform density. The information layer includes a first portion suitable for being read out at a first read-out speed and a second portion suitable for being read out at a second read-out speed higher than the first read-out speed. According to the invention, the second portion of the information layer is at a greater distance to a center of the disc-shaped information carrier than is the first portion of the information layer. A range of rotational speeds which an optical read-out unit must have for a full and correct read-out of the information carrier is reduced in this manner. In a special embodiment, the first portion of the information layer includes a first version of an audio recording provided on the information layer by the DSD transformation method, whereas the second portion of the information layer includes a second version of this same audio recording provided on the information layer by the PCM transformation method.

7 Claims, 1 Drawing Sheet

DISC-SHAPED INFORMATION CARRIER PROVIDED WITH TWO PORTIONS HAVING DIFFERENT READ-OUT SPEEDS

FIELD OF THE INVENTION

The invention relates to a disc-shaped information carrier with a substrate and an information layer which comprises optically readable elementary marks with a substantially uniform density, said information layer being provided with a first portion comprising marks to be read out at a first read-out speed and a second portion comprising marks to be read out at a second read-out speed higher than the first read-out speed.

BACKGROUND OF THE INVENTION

A known optically readable disc-shaped information carrier is the CD. The elementary marks of the information layer of the CD comprise tiny pits which are provided along tracks in the information layer. The density of the marks is defined by an interspacing present between the tracks and an interspacing present between the marks on a track. Besides the standard CD, which can contain an audio program of well over an hour, a high-density CD (HDCD) is known having an information layer where the interspacings present between the tracks, the interspacings present between the marks on a track, and the pits themselves are substantially smaller than on a standard CD. The amount of information which the high-density CD can accommodate is thus substantially greater than the amount of information on the standard CD.

Since the available space on a high-density CD is comparatively large, the information layer of a high-density CD can be provided with more than one portion, such as, for example, a first portion and a second portion, the information of the first portion being suitable, for example, for being read out at a first read-out speed and the information of the second portion being suitable, for example, for being read out at a second read-out speed which is substantially higher than the first read-out speed. The term "read-out speed" is understood to mean the number of elementary marks to be read out per unit time, also called bit rate in the case of a CD. The read-out speed of each of the two portions is determined inter alia by the nature of the information present on each portion of the information layer.

A disadvantage of a disc-shaped information carrier of the kind mentioned in the opening paragraph is that the information carrier can only be fully read out by means of an optical read-out unit which has a comparatively wide range of rotational speeds.

SUMMARY OF THE INVENTION

It is an object of the invention to provide a disc-shaped information carrier of the kind mentioned in the opening paragraph which is capable of complete read-out by means of a read-out unit whose range of rotational speeds is as limited as possible.

According to the invention, the disc-shaped information carrier is for this purpose characterized in that the second portion of the information layer is at a greater distance to the center of the disc-shaped information carrier than is the first portion of the information layer. The rotational speed of the disc-shaped information carrier is determined by the quotient of the read-out speed with which the information is to be read and the distance between the information to be read and the center of the disc-shaped information carrier. As a result, the rotational speed of the information carrier is comparatively high during read-out of information present close to the center of the information carrier and comparatively low during read-out of information present adjacent the outer edge of the information carrier. Since the second portion of the information layer with the comparatively high, second read-out speed is at a greater distance to the center of the information carrier than is the first portion of the information layer having the comparatively low, first read-out speed, according to the invention, the difference between the rotational speed during read-out of the first portion and rotational speed during the read-out of the second portion is substantially reduced. As a result, the information carrier according to the invention is fully readable by means of a read-out unit having a range of rotational speeds which is as limited as possible, so that the read-out unit can be provided with an optimized drive unit.

A special embodiment of a disc-shaped information carrier according to the invention is characterized in that the first portion comprises a first version of an audio recording and the second portion comprises a second version of said audio recording different from the first version. In this special embodiment, in which the available space on the information layer is utilized in an effective manner, the two portions of the information layer comprise two different versions of one and the same audio recording. A user of the information carrier thus has the possibility, for example, of choosing between two different technical versions of the audio recording, or the information carrier is suitable, for example, for use in two different types of read-out units.

A further embodiment of a disc-shaped information carrier according to the invention is characterized in that the first version comprises a two-channel version of the audio recording, while the second version is a six-channel version of the audio recording. The result of this is that a user of the disc-shaped information carrier has an interesting choice, for example, between a two-channel playback and a six-channel playback of the audio recording.

A yet further embodiment of a disc-shaped information carrier according to the invention is characterized in that the first portion and the second portion are provided on the information carrier by means of mutually differing transformation methods. The first portion comprises, for example, information transformed by the DSD method (bit stream method), whereas the second portion comprises, for example, information transformed by the PCM method (pulse code modulation method). As a result, the information carrier is suitable, for example, for use in two different kinds of read-out units.

A special embodiment of a disc-shaped information carrier according to the invention is characterized in that the first portion and the second portion are provided on the information carrier by mutually corresponding transformation methods.

BRIEF DESCRIPTION OF THE DRAWINGS

The invention will be explained in more detail below with reference to the drawing, in which FIG. 1 diagrammatically shows a disc-shaped information carrier according to the invention.

DETAILED DESCRIPTION OF THE DRAWINGS

Figure 1:
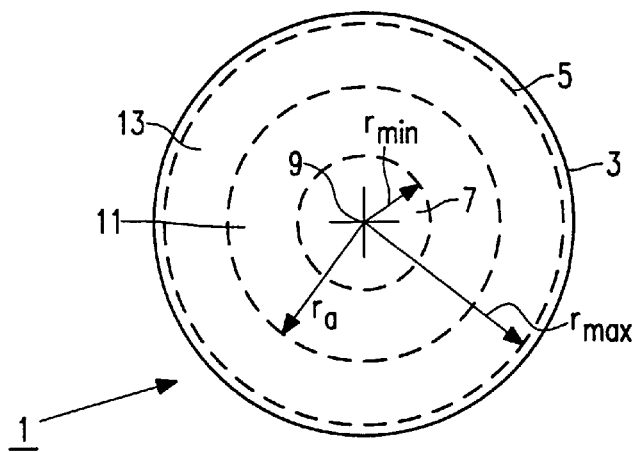

The disc-shaped information carrier 1 according to the invention diagrammatically shown in FIG. 1 comprises a disc-shaped, transparent, synthetic-resin substrate 3 on which a comparatively thin reflecting information layer 5 is provided, which layer comprises optically readable elementary marks. The information layer 5 is readable by means of an optical beam from a side of the substrate 3 facing away from the information layer 5. The elementary marks of the information layer 5 comprise tiny pits which are provided along substantially circular tracks in the information layer 5. The information layer 5 has a substantially uniform density which is defined by an interspacing present between the consecutive tracks and an interspacing present between the elementary marks on a track. The information layer 5 is readable by means of a read-out unit suitable for this purpose, which unit rotates the information carrier 1 about an axis of rotation 9 which passes through a center 7 of the information carrier 1, an optical beam generated by the read-out unit following the tracks of the information layer 5.

As is shown diagrammatically in FIG. 1, the information layer 5 comprises a first portion 11 of optically readable marks and a second portion 13 of optically readable marks. The first portion 11 of the information layer 5 is suitable for being read out at a first read-out speed, whereas the second portion 13 of the information layer 5 is suitable for being read out at a second read-out speed which is substantially higher than the first read-out speed. The term "read-out speed" is understood to mean the number of elementary marks to be read out per unit time in order to achieve a correct playback of the information present on the information layer 5, this being subject inter alia to the nature of the information to be read out.

Figure 2:
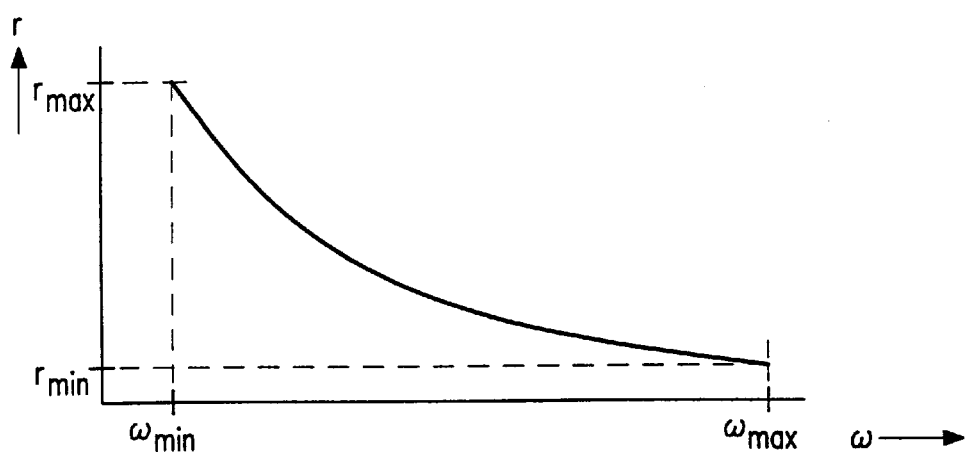
FIG. 2 shows the relation between rotational speed of a known information carrier and distance to center of the information carrier.

As was mentioned above, the information carrier 1 is rotated about the axis of rotation 9 during read-out. The rotational speed $\omega$ is determined by the quotient of the read-out speed and the distance r between the track to be read and the center 7 of the information carrier 1. As a result, the rotational speed $\omega$ is comparatively high during the read-out of information close to the center of the CD (comparatively small value of r) and comparatively low during the read-out of information adjacent an outer edge of the CD (comparatively high value of r) in the case of a standard CD having a single, constant read-out speed. FIG. 2 diagrammatically shows the relation between the rotational speed $\omega$ of such a standard CD and distance r to the center of the CD. The difference between the maximum rotational speed $\omega_{max}$ and the minimum rotational speed $\omega_{MIN}$ is comparatively great, so that it is only possible to read out the standard CD fully by means of a read-out unit having a sufficiently wide range of rotational speeds.

Figure 3:
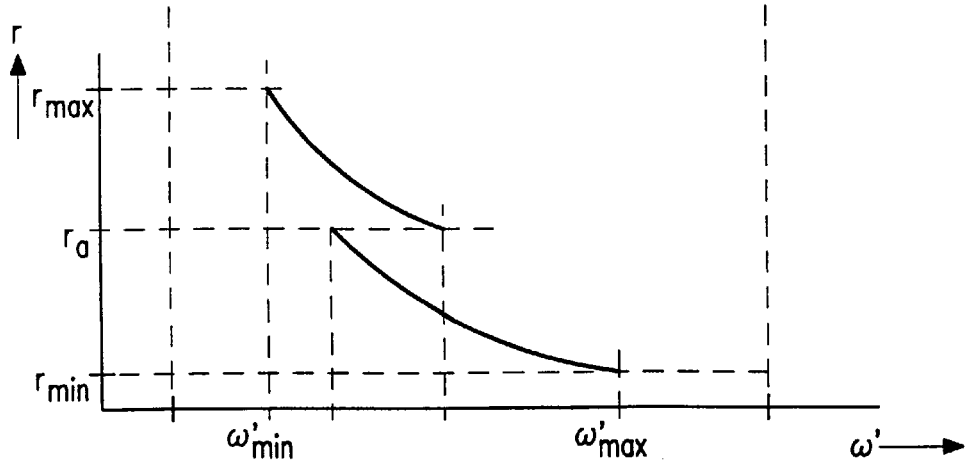
FIG. 3 shows the relation between rotational speed of the information carrier of FIG. 1 and distance to the center of the information carrier.

As FIG. 1 shows, the second portion 13 of the information layer 5 of the information carrier 1 according to the invention is at a greater distance to the center 7 of the information carrier 1 than is the first portion 11 of the information carrier 1. Since the read-out speed of the second portion 13 is substantially higher than the read-out speed of the first portion 11, and the rotational speed of the information carrier 1 is determined by the quotient of the read-out speed and the distance between the information to be read and the center 7 of the track carrier 1, it follows that the difference between the rotational speed of the information carrier 1 during reading of the first portion 11 and the rotational speed of the information carrier 1 during reading of the second portion 13 is comparatively small. FIG. 3 diagrammatically shows the relation between the rotational speed $\omega'$ of the information carrier 1 according to the invention and the distance r to the center 7 of the information carrier 1. The difference between the maximum rotational speed $\omega'_{MAX}$ and the minimum rotational speed $\omega'_{MIN}$ is considerably smaller than the difference shown in FIG. 2 between the maximum rotational speed $\omega_{MAX}$ and the minimum rotational speed $\omega_{MIN}$ for the standard CD. As a result, the information carrier 1 can be fully read out by means of a read-out unit which has only a limited range of rotational speeds.

The first portion 11 and the second portion 13 of the information layer 5 comprise, for example, a first version and a second version of one and the same audio recording, respectively. The first version corresponds, for example, to a two-channel version of the audio recording provided on the first portion 11 by the DSD transformation method (bit stream method or 1-bit oversampled audio signal method), whereas the second version corresponds, for example, to a six-channel version of the audio recording provided on the second portion 13 by the PCM transformation method (pulse code modulation method). A user of the information carrier 1 thus has a choice, for example, between the two versions of the audio recording mentioned above, or the information carrier 1 can be read out, for example, by means of two different kinds of read-out units, i.e. by means of a read-out unit suitable for reading out information transformed by the DSD transformation method and a read-out unit suitable for reading out information transformed by the PCM transformation method.

In the disc-shaped information carrier 1 according to the invention as described above, the first portion 11 is suitable for being read out at a first read-out speed, while the second portion 13 is suitable for being read out at a second read-out speed which is substantially higher than the first read-out speed. It is noted that the first read-out speed and the second read-out speed themselves need not have constant or substantially constant values. Thus, for example, the first read-out speed and the second read-out speed may each have an average value, the values of the two read-out speeds being allowed to deviate from the respective average values by, for example, at most 10%.

It is further noted that a disc-shaped information carrier according to the invention may alternatively be provided with more than two portions. Thus an information carrier according to the invention may be provided, for example, with three portions, a first portion provided adjacent the center of the information carrier having a comparatively low read-out speed, a third portion provided adjacent an outer edge of the information carrier having a comparatively high read-out speed, and a second portion provided between the first portion and the third portion having a read-out speed which is higher than the read-out speed of the first portion and lower than the read-out speed of the third portion.

The first portion 11 of the information carrier 1 according to the invention as described above comprises a first version of an audio recording, while the second portion 13 comprises a second version of the same audio recording. It is noted that the two portions of an information carrier according to the invention may also be assigned in a different manner such as, for example, an arrangement in which the first portion comprises a version of a first audio recording and the second portion a version of a second audio recording.

It is finally noted that the two portions of the information carrier according to the invention may also be provided on the information carrier by one and the same transformation method such as, for example, the DSD transformation method or the PCM transformation method.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

I claim:

1. A disc-shaped information carrier comprising:

a substrate; an information layer which includes optically readable elementary marks with a substantially uniform density; and wherein:

the marks in a first portion of the information layer are adapted to be read out at a first read-out speed;

the marks in a second portion of the information layer are adapted to be read out at a second read-out speed higher than the first read-out speed;

the second portion of the information layer is at a greater distance from a center of the disc-shaped information carrier than is the first portion of the information layer; and the first portion includes a first version of an audio recording and the second portion includes a second version of said audio recording.

2. A disc-shaped information carrier comprising:

a first portion which includes a two-channel version of an audio recording; and a second portion which includes a six-channel version of the audio recording;

and in which the second portion is at a greater distance from a center of the disc-shaped information carrier than is the first portion.

3. A disc-shaped information carrier as claimed in claim 1, in which the first portion and the second portion of the information carrier are formed thereon by mutually differing transformation methods.

4. A disc-shaped information carrier as claimed in claim 1, in which the first portion and the second portion of the information carrier are formed thereon by mutually corresponding transformation methods.

5. The carrier of claim 1, in which:

the first version is a two-channel form of the audio recording, while the second version is a six-channel form of the audio recording; and the first portion and the second portion of the information carrier are formed thereon by mutually differing transformation methods.

6. The carrier of claim 1, in which:

the first version is a two-channel form of the audio recording, while the second version is a six-channel form of the audio recording; and the first portion and the second portion of the information carrier are formed thereon by mutually corresponding transformation methods.

7. The disc-shaped information carrier as claimed in claim 1, in which the first version is a two-channel form of the audio recording, while the second version is a six-channel form of the audio recording.

* * * * *